Aug. 16, 1932.　　L. A. CHAPLEAU　　1,872,406

FISHING LURE

Filed May 19, 1930

INVENTOR.
Louis A. Chapleau.
BY
ATTORNEY.

Patented Aug. 16, 1932

1,872,406

UNITED STATES PATENT OFFICE

LOUIS A. CHAPLEAU, OF SOUTH BEND, INDIANA, ASSIGNOR TO SOUTH BEND BAIT COMPANY, OF SOUTH BEND, INDIANA

FISHING LURE

Application filed May 19, 1930. Serial No. 453,568.

The invention relates to fishing lures, and has for its object to provide a lure having a forward downwardly inclined diving plate causing the lure to dive as it is drawn through the water.

A further object is to provide a lure whose body has a forward upwardly inclined face to which a plate is secured which terminates in a forwardly downwardly inclined portion projecting from said body.

A further object is to provide a lure having a body whose head end tapers substantially to a point and carries a forwardly inclined diving plate whose width is substantially the same as the width of said body so that its sides form continuations of the stream line of the body, said tapered head permitting a maximum surface area of the plate to be presented to the action of the water in the movement of the lure therethrough.

A further object is to provide a fishing lure whose body has converging upper and lower forward faces and a plate secured to the lower face and projecting forwardly of said body at substantially the same inclination as the upper face.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
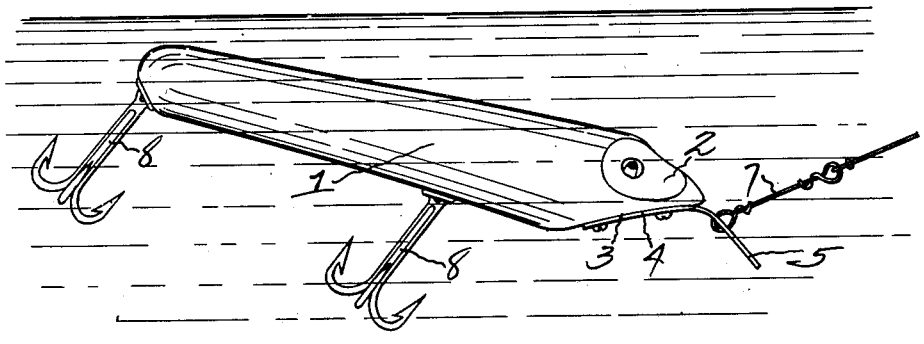
Figure 1 is a view of the lure in side elevation.
Figure 2:
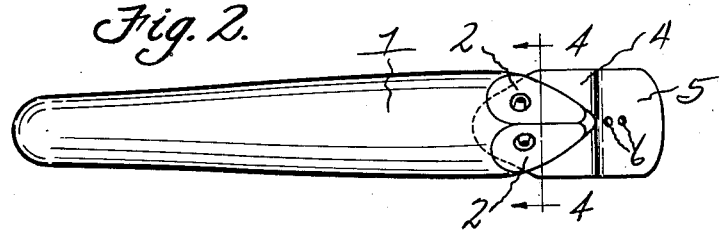
Figure 2 is a top plan view of the lure.
Figure 3:
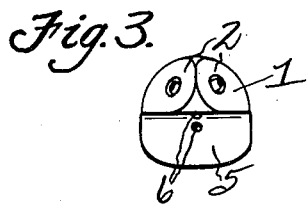
Figure 3 is a front view of the lure.
Figure 4:
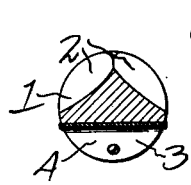
Figure 4 is a transverse vertical sectional view of the lure taken on line 4—4 of Figure 2.

Referring to the drawing, which illustrates the preferred embodiment of the invention, the numeral 1 designates a lure body of the plug type whose head end preferably tapers substantially to a point. In the upper portion of the head end of the lure body are formed a pair of forwardly downwardly inclined faces, preferably slightly concaved, which are relatively angularly disposed on each side of the head end, as shown in Figure 4; and in the lower portion of the head end of the body is formed a forwardly upwardly inclined face 3, also preferably slightly concaved; said upper and lower faces converging substantially centrally of the body. Secured to the lower upwardly inclined face 3 is a plate 4 which has integrally formed therewith a forwardly downwardly inclined diving portion 5 of substantially the same width as the body, said portion 5 projecting from the forward end of the body at substantially the same inclination relative to the longitudinal axis of the body as the upper inclined faces 2. Holes 6 are pierced in plate 5 to receive a line securing means 7, and hooks 8 are secured to the under side and rear of the body.

The downwardly inclined diving portion 5 of plate 4 causes the lure to dive when rapidly drawn through the water, and the upper inclined faces 2 of the lure body aid the diving action by their inclination, and cause the lure to move in a zig-zag path of travel. The shape of the diving plate in combination with the position of the lower inclined face 3 of the lure body forms a concavity in the forward under side of the lure which enhances the diving characteristics of the lure and agitates the water as the lure passes therethrough. The forwardly downwardly inclined portion 5 of plate 4 forms means for stabilizing the position of the lure in the water, since its shape and width are such as to prevent the lure from turning on its back in its movement in the water. It will also be seen that the tapering head end of the lure in combination with a diving plate of a width equal to the width of the lure body and forming a continuation of the stream lines of the lure body permits a maximum area of the diving plate to be operatively exposed to the water through which it passes, thus enhancing the diving action produced by and the stabilizing effect of the lure in the water without requiring a relatively large plate.

The invention having been set forth, what is claimed as new and useful is:

In a fishing lure, a plug type body having upper and lower converging faces formed at the forward end thereof, and a plate carried by said lower face and terminating in a portion inclined forwardly downwardly from the front end of the body and at substantially the same inclination as said upper face, the side edges of said plate forming a continuation of the stream lines of said body.

In testimony whereof I affix my signature.

LOUIS A. CHAPLEAU.